Dec. 27, 1932.  W. FERRIS ET AL  1,892,208
WELDING MACHINE
Filed Nov. 28, 1930  5 Sheets-Sheet 1

Inventor
WALTER FERRIS.
JOHN P FERRIS.
GLEN MACOMBER.
By Wesley P Merrill
Attorney Dec. 27, 1932.    W. FERRIS ET AL    1,892,208
WELDING MACHINE
Filed Nov. 28, 1930    5 Sheets-Sheet 3

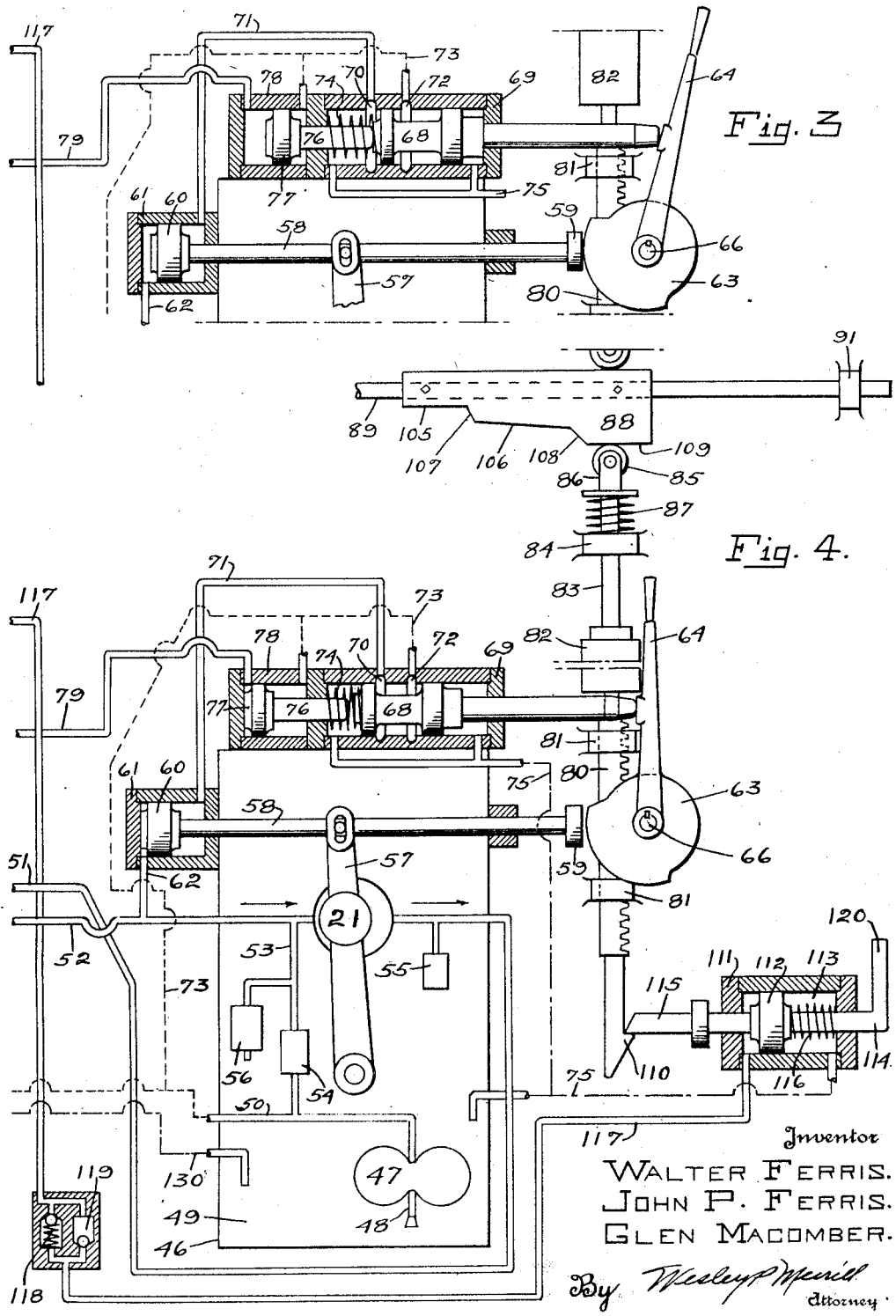

Dec. 27, 1932.  W. FERRIS ET AL  1,892,208
WELDING MACHINE
Filed Nov. 28, 1930   5 Sheets-Sheet 5
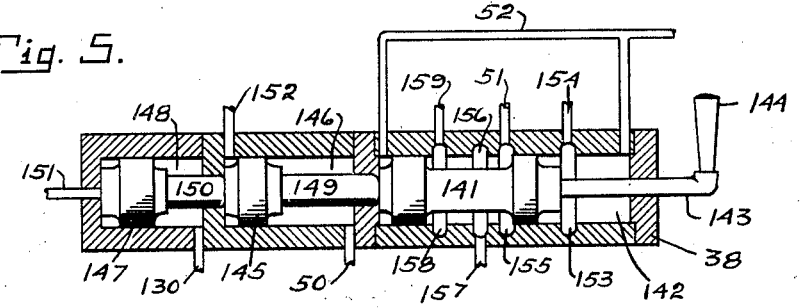
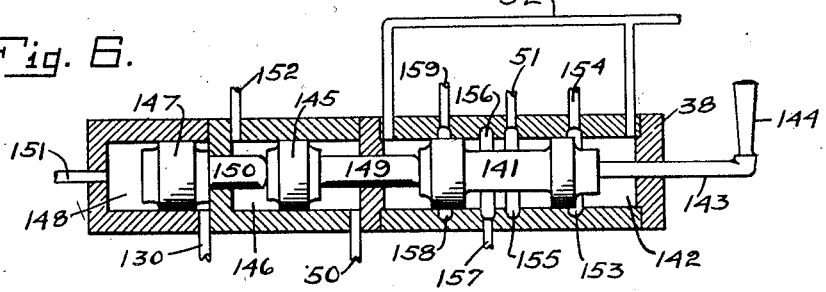
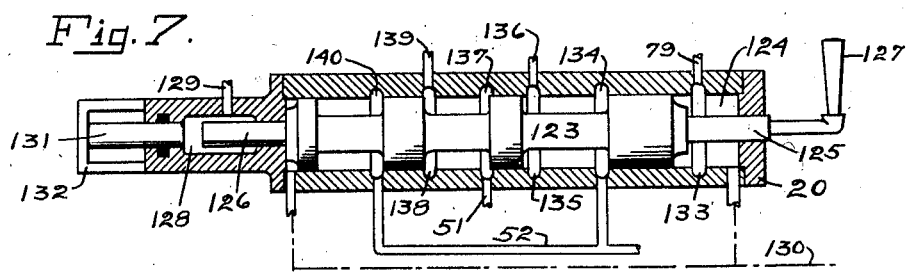
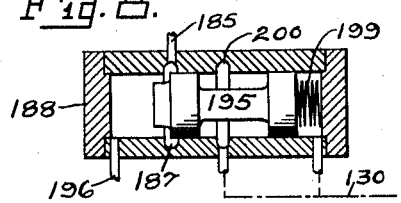
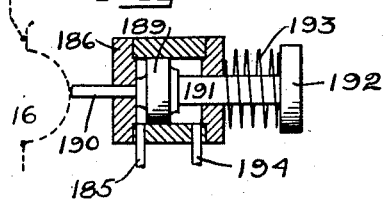
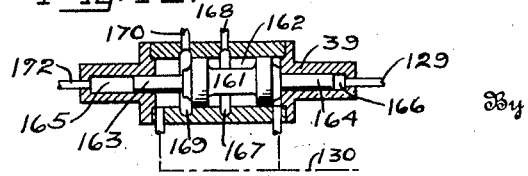
Inventor
WALTER FERRIS.
JOHN P. FERRIS.
GLEN MACOMBER.
Attorney Patented Dec. 27, 1932

1,892,208

UNITED STATES PATENT OFFICE

WALTER FERRIS, OF MILWAUKEE, JOHN P. FERRIS, OF WHITEFISH BAY, AND GLEN MACOMBER, OF WAUKESHA, WISCONSIN, ASSIGNORS TO THE OILGEAR COMPANY, OF MILWAUKEE, WISCONSIN, A CORPORATION OF WISCONSIN

WELDING MACHINE

Application filed November 28, 1930. Serial No. 498,656.

This invention relates to butt welding machines.

The welding machine to which the invention applies in particular has a clamp arranged upon its frame in a stationary position for holding one piece of the work to be welded, another clamp arranged upon a movable carriage for holding the other piece of the work, electric conductors connecting the two clamps to opposite sides of an electric circuit, and mechanism for advancing the carriage to bring the two pieces of work into engagement with each other and thereby close the electric circuit.

When contact is first made between the ends of the two pieces, the flow of electric current therethrough causes irregularities thereon to be burned off and then the ends become incandescent and fuse together.

The carriage is advanced slowly to provide sufficient time for the burning or flashing process and for heating the ends of the pieces, and then it is advanced more rapidly to force the incandescent ends of the pieces together and cause the same to fuse into an integral mass.

The clamps are ordinarily operated either mechanically or pneumatically, the carriage is ordinarily operated either mechanically or hydraulically, and the operation of the clamps and the carriage is under the control of the operator.

An object of the invention is to provide a welding machine which is operated hydraulically.

Another object is to operate both the clamps and the carriage hydraulically by liquid supplied from a single pump.

Another object is to provide a welding machine which may be controlled either automatically or manually.

Another object is to provide an automatically controlled welding machine of which the operator may assume control at any instant during the welding process.

Another object is to deliver a driving liquid to a hydraulic motor until a predetermined pressure has been created therein and then maintain that pressure substantially constant after the motor has been disconnected from its source of driving liquid.

Another object is to control the speed of a motor within a narrow low range during certain periods of an operation and then suddenly accelerate the motor to a higher speed during another period of the operation.

According to the invention in one of its aspects, the clamps and the carriage are operated by hydraulic motors which are driven by liquid supplied from a single pump.

According to the invention in another aspect, pressure is applied by a hydraulic motor through an energy accumulator, such as a caged spring, the motor is then disconnected from its source of driving liquid to allow the entire delivery of liquid from that source to be employed for other purposes, the inlet to the motor is blocked to trap the driving liquid within the motor, and the accumulator compensates for any leakage losses and maintains the motor pressure substantially constant.

The invention further provides a welding machine having control mechanism which may be operated either automatically or manually and which, when being operated automatically, enables the operator to assume control at any point in the welding process.

The invention further provides pump control mechanism which is operable manually to vary the rate of the pump delivery between zero and a predetermined maximum and operable automatically to vary the rate of delivery of the pump between its maximum volumetric capacity and a minimum volume.

The invention is embodied in the welding machine illustrated in the accompanying drawings in which the views are as follows:

Fig. 3 is a schematic drawing showing the pump control lever and valve in different positions from those shown in Fig. 2A.

Fig. 4 is a view similar to Fig. 2A but showing the pump at full stroke.

Fig. 5 is a longitudinal section through a valve which controls the clamping motors, showing the valve plungers in the positions occupied when the clamps are being closed.

Fig. 6 is a view similar to Fig. 5 but showing the plungers in the positions occupied to trap the liquid in the clamping motors and hold the clamps closed.

Fig. 7 is a longitudinal section through a valve which controls the carriage motor, showing the valve plunger in the position occupied when the motor is being operated.

Fig. 8 is a longitudinal section through the valve which controls the switch motor, showing the valve plunger in the position occupied when the switch is closed.

Fig. 9 is a longitudinal section through the switch motor and shows the motor piston in position to hold the switch closed.

Fig. 10 is a longitudinal section through a valve which controls the bypassing of liquid from one end of each clamping motor to the other end thereof.

Figure 1:
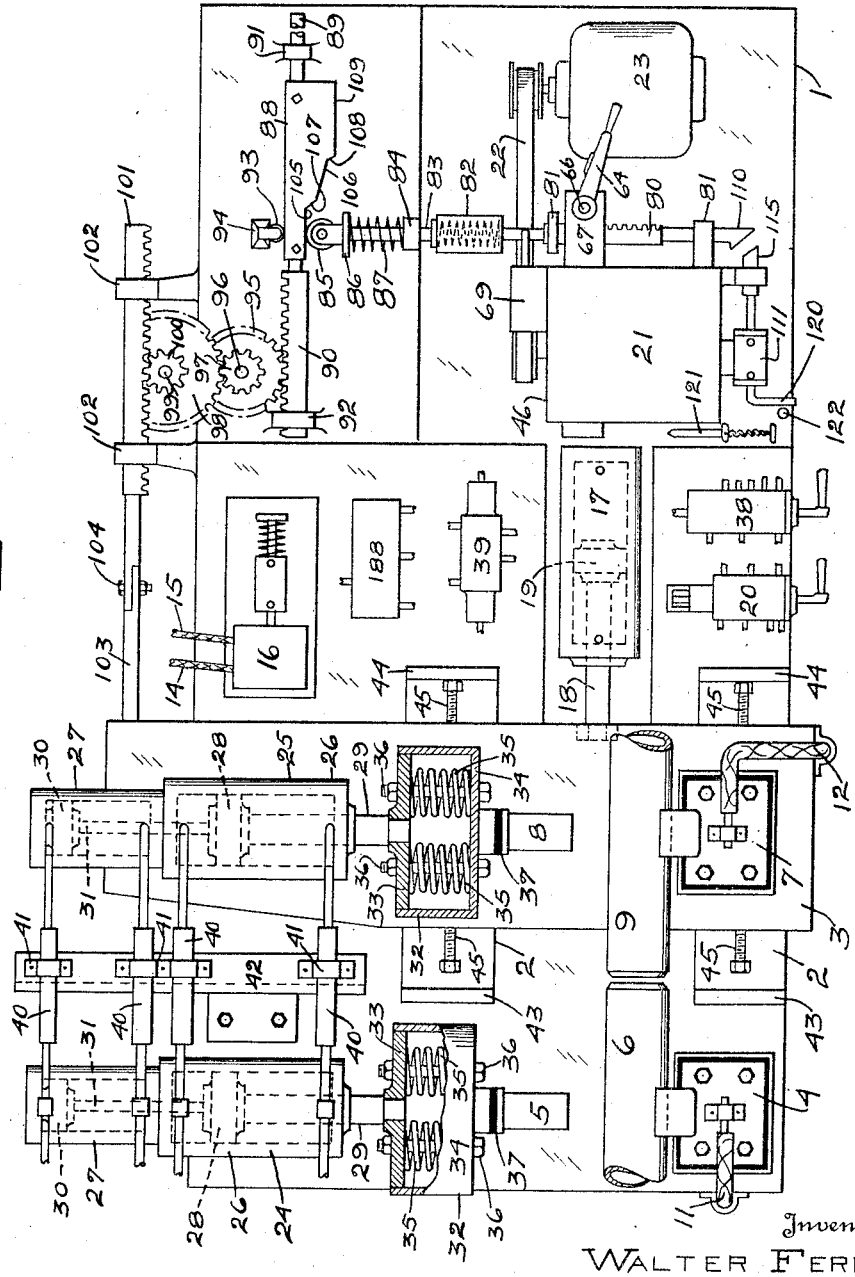
Fig. 1 is a top plan view of a well known type of welding machine to which the invention has been applied, the piping being omitted to simplify the view and certain parts being shown in section.
Figure 2:
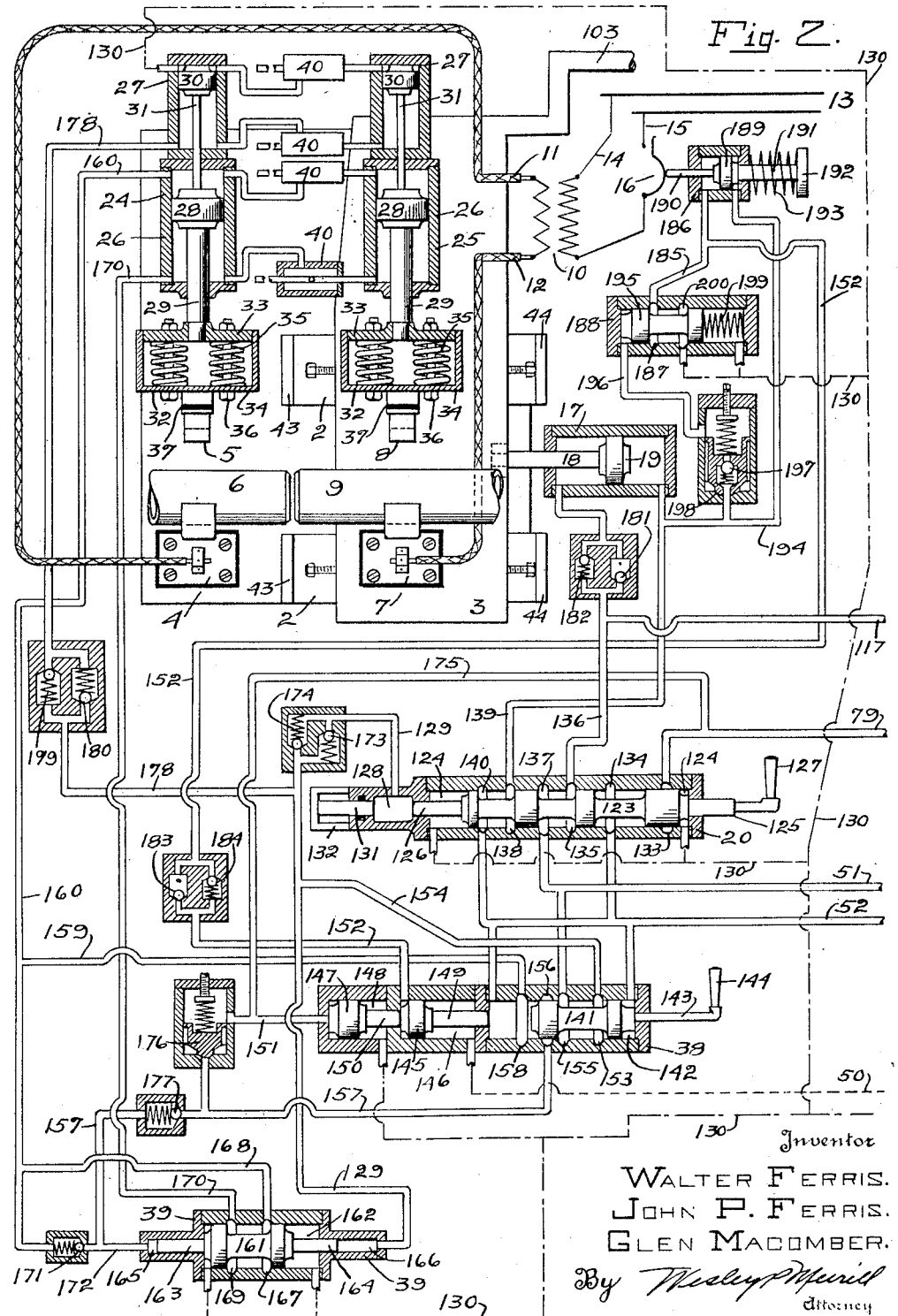
Figs. 2 and 2A are a schematic drawing of the hydraulic circuit and the pump control mechanism and show certain details of construction. The several valve plungers and the control mechanism are shown in the positions occupied when the machine is idle.

The welding machine shown in Fig. 1 has a frame 1 provided with two slides or ways 2, a carriage 3 arranged upon the ways 2 to slide thereon and overhanging the sides thereof to hold it against lateral movement, a stationary clamp having a jaw 4 secured in a stationary position upon the frame 1 and insulated therefrom and a movable jaw 5 for cooperating with the jaw 4 to clamp a tube 6 or other piece of work therebetween, a movable clamp having a jaw 7 fixed in a stationary position upon the carriage 3 and insulated therefrom and a movable jaw 8 for cooperating with the jaw 7 to clamp a tube 9 or other piece of work therebetween, and a transformer 10 which is shown diagrammatically in Fig. 2 and which may be arranged within the frame 1.

The transformer 10 has its secondary winding connected to the jaws 4 and 7 by cables 11 and 12, respectively, and its primary winding connected to one side of a power line 13 by a conductor 14 and to the other side of the power line 13 by a conductor 15 and a switch 16.

The machine thus far described has not been illustrated nor described in detail as it is of ordinary construction and well known.

The carriage 3 is operated by a hydraulic motor 17 which has its cylinder secured to the frame 1 and the rod 18 of its piston 19 attached to the carriage 3. The motor 17 is operated by liquid supplied through a control valve 20 from a variable delivery pump 21 shown as being carried by the frame 1 and driven through a belt 22 from an electric motor 23.

The jaw 5 is advanced and retracted by a hydraulic motor 24 which is secured to the frame 1, the jaw 8 is advanced and retracted by a hydraulic motor 25 which is secured to the carriage 3, and both of these motors are operated by liquid supplied by the pump 21. As the motors 24 and 25 and associated parts are identical both as to structure and function, like parts thereof have been indicated by like reference numerals.

Each of the clamping motors 24 and 25 has a main cylinder 26 and a pull-back cylinder 27 which is shown arranged in axial alinement with the cylinder 26 and secured to the rear end thereof. Each of the cylinders 26 contains a clamping piston 28 having its piston rod 29 extending through the front end thereof, and each of the cylinders 27 contains a pull-back piston 30 which is connected to the piston 28 by a pull-back rod 31 of smaller diameter than the piston rod 29.

Each of the piston rods 29 is provided upon its outer end with a caged spring accumulator 32 having its head 33 secured to the rod 29 and telescoping with a housing 34 which contains a set of springs 35 and is limited in its outward movement by bolts 36 extending loosely through its forward end and through the head 33. The limit bolts 36 maintain a considerable initial tension in the springs when the accumulator is fully extended and, as the accumulator is progressively compressed, the spring force and the fluid pressure on pistons 28 increase correspondingly.

The jaws 5 and 8 are secured to the front ends of the housings 34 and are insulated therefrom by insulators 37 in order to prevent short-circuiting the electric current during the welding process.

The motors 24 and 25 are controlled by a control valve 38 and a bypass valve 39, and are connected to each other at the forward and the rear ends of both cylinders 26 and 27 by four expansion joints 40 which are supported in any suitable manner, as by being secured by straps 41 to a bracket 42 carried by the frame 1, and are preferably non-differential as indicated in Fig. 2, in which one expansion joint 40 is shown in longitudinal section.

The driving liquid is delivered to and discharged from the movable motor 25 through the expansion joints 40 which enable the carriage 3 to reciprocate upon the ways 2 between fixed limits, such as a stop 43 arranged at one end of each way 2 and a stop 44 arranged at the other end thereof.

It is also desirable to vary the distance which the carriage 3 may move in either direction and this may be accomplished by threading a stop screw through each of the stops 43 and 44 or by threading a stop screw 45 into the carriage 3 in alinement with each of those stops, as shown in Fig. 1.

In operation, the pump 21 delivers liquid to the power end of the cylinders 26 until the springs 35 are deflected and the jaws 5 and 8 are exerting a predetermined pressure against the work. The liquid in the power ends of the cylinders 26 is then trapped therein and the output of the pump 21 diverted to other uses, the springs 35 maintaining the pressure against the work substantially constant and compensating for the small slip or leakage which ordinarily occurs in the motors and the valves.

The pump 21 is shown diagrammatically as being arranged in a housing 46 and supercharged by a gear pump 47, but it has not been illustrated nor described in detail herein as such a pump is fully disclosed in Patent 1,619,200 issued March 1, 1927 to Walter Ferris.

The gear pump 47 is driven in unison with the variable delivery pump 21 and draws its supply of liquid through a suction pipe 48 from a reservoir 49 in the lower part of the housing 46 and delivers it into a low pressure supply pipe 50.

Liquid is delivered by the pump 21 to the hydraulic motors through a high pressure supply pipe 51 and liquid is returned from the hydraulic motors to the pump 21 through a return pipe 52 to which the low pressure supply pipe 50 is connected through a pipe 53 and a resistance valve 54.

The pipe 51 has a relief valve 55 connected thereto through which liquid is discharged into the reservoir 49 whenever the pressure in the pipe 51 reaches the predetermined maximum, for instance 1200#, and the pipe 53 has a relief valve 56 connected thereto through which excess liquid delivered by the pump 47 is discharged into the reservoir 49 and which limits the pressure in the pipe 53 to a predetermined maximum, for instance 40#.

The gear pump 47 will thus maintain a pressure of 40# in the return pipe 52 and a pressure in the supply pipe 50 which is equal to the total resistances of the valves 54 and 56. If the valve 54 has a resistance of 200#, a pressure of 240# will be maintained in the pipe 50.

The pumps 21 and 47 are driven at a constant speed and the delivery of the pump 21 is varied by moving the free end of an arm 57 to change the stroke of the pump and thereby vary pump displacement.

The arm 57 is operated manually in the pump disclosed in Patent No. 1,619,200 but, in the present invention, it is operated both manually and automatically by a control rod 58 which is pivoted intermediate its ends to the arm 57 and provided upon one of its ends with an abutment 59 and upon its other end with a piston 60 arranged in a cylinder 61 shown as being secured to the housing 46.

The head end of the cylinder 61 is connected through a pipe 62 to the return pipe 52 so that the piston 60 is subjected at all times to the pressure therein which urges the rod 58 to the right to reduce the stroke of the pump 21.

This movement of the rod 58 is limited by the abutment 59 engaging a cam 63 fixed for rotation with a hand lever 64 and a gear 65 which are arranged upon a shaft 66 journaled in a bearing 67 carried by the pump housing 46.

Figure 2A:
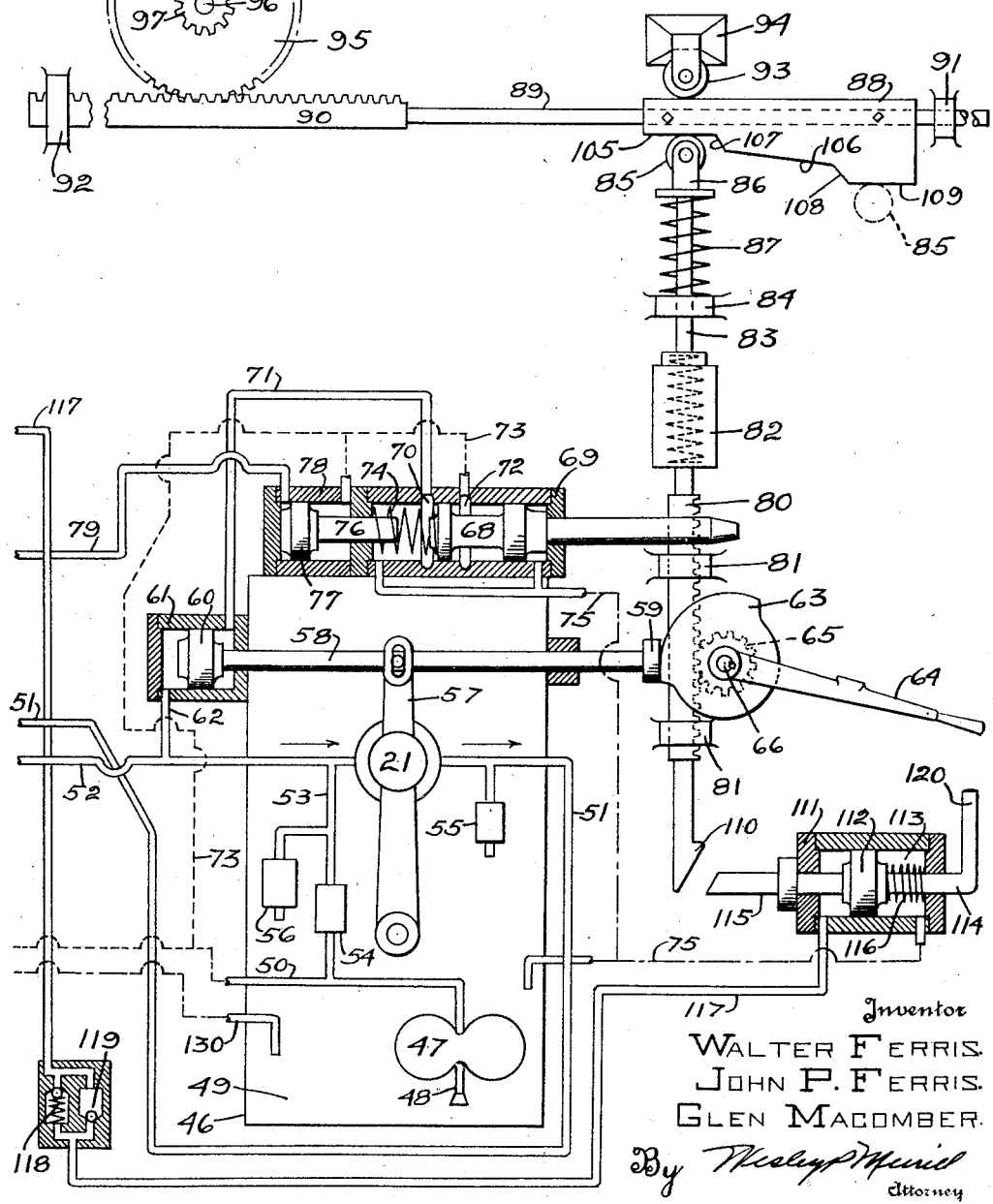

The stroke control mechanism is ordinarily so adjusted that, when the abutment 59 engages the lowest part of the cam 63 as shown in Fig. 2A, the pump 21 will be at zero stroke and no liquid will be delivered thereby.

The contour of the cam 63 is such that the operator may easily swing the handle 64 to rotate the cam 63 and force the rod 58 and the piston 60 to the left against the liquid pressure in the cylinder 61, thereby gradually increasing the stroke and delivery of the pump 21 a limited amount.

As the cam 63 approaches the limit of its effective movement, the handle 64 engages the plunger 68 of a stroke control valve 69 and moves it to the left to open communication between a port 70, which is connected to the gland end of the cylinder 61 by a pipe 71, and a port 72 which is connected to the supply pipe 50 by a pipe 73.

Liquid at gear pump pressure now enters the cylinder 61 and forces the piston 60 and the rod 58 to the left, thereby quickly changing the pump 21 from an intermediate stroke to full stroke. The low pressure liquid in the head end of the cylinder 61 is expelled into the return pipe 52 and an equal amount of liquid is exhausted through the relief valve 56.

The plunger 68 is urged outwardly by a helical compression spring 74 to normally separate the ports 70 and 72, and each end of the valve 69 is connected to a drain pipe 75 to allow air or liquid to bypass from one end of the valve casing to the other end thereof as the plunger reciprocates and to allow liquid to be discharged from the gland end of the cylinder 61 into the drain pipe 75.

At a certain point in the operation of the machine, the valve plunger 68 is urged to its neutral position by a plunger 76 which extends through the head end of the valve 69 and has its outer end secured to a piston 77 arranged in a cylinder 78 carried by the casing of the valve 69 and forming substantially a part thereof. The cylinder 78 is connected at its head end to a pipe 79, through which high pressure liquid is delivered to advance the piston 77 and return the valve plunger 68 to its neutral position, and is connected at its gland end to the pipe 73 so that the piston 77 is normally held in its retracted position by gear pump pressure.

When the machine is being operated manually and the operator has moved the handle 64 to operate the valve 69 and thus put the pump 21 on full stroke, he must hold the plunger 68 in its operative position against the action of the spring 74 to keep the pump 21 on full stroke.

However, when one or more of the motors stall, high pressure liquid is supplied to the cylinder 78 through the pipe 79 to advance the piston 77 which has a sufficiently large area to enable the high pressure liquid to exert a greater force thereon than the operator can resist, thereby putting the pump 21 on short stroke.

In order that the machine may also be controlled automatically, the gear 65 previously described is fixed for rotation with the handle 64 and in mesh with an axially movable rack 80 which is held against lateral movement by stationary guides 81.

The rack 80 is connected through a caged spring 82 to one end of a rod 83 which extends through a stationary guide 84 and has a cam roller 85 journaled in a bearing 86 secured to its other end.

The rod 83 is encircled by a helical compression spring 87 which is arranged between the guide 84 and the bearing 86 and urges the cam roller 85 against a cam 88 carried by a cam rod 89 having a rack 90 secured to one end thereof.

The cam 88, the cam rod 89 and the rack 90 are held in alinement by a stationary guide 91 through which the free end of the rod 89 extends, a stationary guide 92 through which the rack 90 extends, and a roller 93 which is journaled in a stationary bearing 94 and engages the cam 88 upon the side thereof opposite the side engaged by the cam roller 85 to oppose the thrust of the spring 87.

The rack 90 meshes with a gear 95 arranged upon a shaft 96 which is carried by the frame 1 and has a pinion 97 also arranged thereon in fixed relation to the gear 95 and in mesh with a gear 98 arranged upon a shaft 99 carried by the frame 1, and the shaft 99 also has a pinion 100 arranged thereon in fixed relation to the gear 98 and in mesh with a rack 101 arranged in stationary guides 102 carried by the frame 1.

The rack 101 is connected to the carriage 3 by a rod 103 which, preferably, has a joint or splice 104 to allow the automatic control mechanism just described to be disconnected from the carriage 3 when the machine is to be operated manually.

When the machine is idle, the roller 85 abuts a neutral face 105 on the cam 88 and the pump is at zero stroke, but, when the carriage 3 is advanced, the rack 101 is advanced and operates the gears 100, 98, 97 and 95 to advance the rack 90 and the cam 88, thereby bringing an inclined cam face 106 on the cam 88 into engagement with the cam roller 85.

The cam face 106 is joined to the neutral face 105 by a short inclined face 107 and it has the contour required to advance the carriage 3 at the desired speed or speeds, depending upon the character of the work to be performed, and this speed or speeds and the contour of the face 106 are ordinarily determined by experiment.

As shown, the cam face 106 is inclined gradually from its junction with the face 107 to its junction with a cam face 108 having a steeper pitch and merging with a face 109 which is parallel to the line of movement of the cam 88.

As the cam 88 advances, the face 106 travels over the roller 85 and moves the rod 83 and the rack 80 through the guides 84 and 81 against the action of the spring 87, thereby rotating the gear 65 and the cam 63 to gradually increase the stroke of the pump 21 and accelerate the movement of the carriage 3.

The caged spring 82 has sufficient strength to transmit the movement of the rod 83 to the rack 80 but it may be easily overcome by the operator due to the length of the lever 64. Consequently, should the operator desire to decelerate the carriage 3 or to stop it, he may operate the lever 64 to move the rack 80 in the opposite direction against the action of the spring 82 and thereby shorten the stroke of the pump 21 or put it on zero stroke.

As the cam face 108 passes over the roller 85, it moves the rod 83 and the rack 80 sufficiently to cause the gear 65 to swing the lever 64 against the plunger 68 and operate the valve 69 to put the pump 21 on full stroke in the manner previously described, and then the pump 21 is held at full stroke by the face 109 on the cam 88 moving over the roller 85.

In order that the pump 21 may be held on full stroke when the carriage 3 is retracted, the rack 80 is provided at its lower end with a catch 110 to engage a latch 111 having a piston 112 arranged in its cylinder 113 and provided upon its rear end with a tail rod 114, which extends through the rear end of the cylinder 113, and upon its front end with a stem 115 which extends through the front end of the cylinder 113.

The piston 112 is urged forwardly by a helical compression spring 116, which encircles the tail rod 114 between the piston 112 and the rear head of the cylinder 113, and the ends of the catch 110 and the stem 115 are beveled so that, when the rack 80 approaches the limit of its advance, these beveled faces meet and force the piston 112 rearwardly against the action of the spring 116 until the beveled face on the catch 110 passes beyond the stem 115 and then the spring 116 advances the piston 112 and the stem 115 engages the catch 110 to hold the rack 80 against retraction.

The rear end of the cylinder 113 is connected by the drain pipe 75 to the reservoir 49 to allow a free flow of liquid or air when the piston 112 is reciprocated, and the front end of the cylinder 113 is connected to a pipe 117 which has a high pressure resistance valve 118 and a check valve 119 connected in parallel therein.

When the piston 112 is advanced by the spring 116, liquid is expelled from the front end of the cylinder 113 through the pipe 117 and the check valve 119.

The resistance valve 118 is ordinarily adjusted to resist a high pressure, for instance 1000#, and at a certain point in the operation of the machine. high pressure liquid breaks through this valve and forces the piston 112 rearwardly to release the latch and allow the spring 87 to return the stroke control mechanism to its neutral position.

If the machine is to be controlled manually, the piston 112 is retracted by means of a handle 120 on the tail rod 114 and secured in retracted position against the action of the spring 116, as by latching the handle 120 behind a pin 121 inserted in a hole 122 in the frame 1.

Referring now more particularly to Figs. 2 and 7, the carriage control valve 20 has a plunger 123 arranged in its valve chamber 124 and provided upon its front end with a stem 125 and upon its rear end with a stem 126 which has substantially the same diameter as the stem 125.

The stem 125 extends through the front wall of the chamber 124 and is provided upon its outer end with a handle 127 for operating the valve manually, and the stem 126 extends through the rear wall of the chamber 124 into a pressure chamber 128 to which a pipe 129 is connected for supplying pressure liquid to operate the valve hydraulically.

The valve 20 is balanced hydraulically by the arrangement of the several pistons on its plunger 123 and by connecting each end of the valve chamber 124 to a branch of a drain pipe 130 which discharges into the reservoir 49, and it is balanced atmospherically by means of a compensating plunger 131 which has substantially the same cross-sectional area as the stem of the plunger 123 and is fitted in the rear wall of the chamber 128 and limited in its outward movement by a stop 132.

The plunger 123 controls a port 133 which communicates with the pipe 79, a port 134 which communicates with a branch of the return pipe 52, a port 135 which communicates with a pipe 136, a port 137 which communicates with a branch of the supply pipe 51, a port 138 which communicates with a pipe 139 connected to the head end of the carriage motor 17, and a port 140 which communicates with another branch of the return pipe 52.

Referring now more particularly to Figs. 2, 5 and 6, the clamp-control valve 38 has a plunger 141 arranged in its valve chamber 142 and provided upon its front end with a stem 143 to which a handle 144 is secured for operating the valve 38 manually.

The valve 38 is operated hydraulically by a piston 145, which is fitted in a cylinder 146 arranged at the rear end of the valve chamber 142, and by a piston 147 which is fitted in a cylinder 148 arranged upon the rear end of the cylinder 146.

The piston 145 is provided upon its forward end with a stem 149 which extends through the end of the valve chamber 142 to engage the end of the valve plunger 141, and the piston 147 is provided upon its forward end with a stem 150 which extends through the end of the cylinder 146 to engage the piston 145.

The cylinder 148 has its gland end open to the drain pipe 130 and its head end connected to a pipe 151 through which pressure liquid is supplied for advancing the piston 147 to thereby advance the piston 145 and the valve plunger 141, the stem 150 being of the correct length to move the plunger 141 to the position shown in Fig. 6.

The cylinder 146 has its gland end open at all times to the supply pipe 50, so that the piston 145 is normally held in the positions shown in Figs. 2 and 5 by gear pump pressure, and its head end its connected to a pipe 152 through which pressure liquid is supplied to the cylinder 146 for advancing the piston 145 and the plunger 141; the stem 149 being of the correct length to move the plunger 141 to the position shown in Fig. 2.

The valve chamber 142 is connected at its ends to branches of the return pipe 52 and is provided intermediate its ends with a port 153 which is connected by a pipe 154 to the pipe 129, a port 155 which is connected to a branch of the supply pipe 51, a port 156 which is connected to a pipe 157, and a port 158 which is connected by a pipe 159 to a pipe 160.

Referring now more particularly to Figs. 2 and 10 the bypass valve 39 has a plunger 161 arrange in its valve chamber 162 and provided upon its ends with stems 163 and 164 which are fitted, respectively, in cylinders 165 and 166 arranged at the ends of the chamber 162.

The valve chamber 162 is connected at its ends to the drain pipe 130 and provided intermediate its ends with a port 167, which is connected by a pipe 168 to the pipe 160, and a port 169 which is connected by a pipe 170 to the clamp motor 24 at the gland end of its cylinder 26.

The head end of this cylinder 26 is connected to one end of the pipe 160, and the other end of the pipe 160 is connected through a check valve 171 and a pipe 172 to the outer end of the cylinder 165.

The pipe 129 connects the outer end of the cylinder 166 to the pipe 154 and it has connected in parallel therein, at a point intermediate its junction with the pipe 154 and its connection to the pressure chamber 128, a check valve 173 and a resistance valve 174 having a high resistance, for instance 800#.

The pipe 151 is connected by a pipe 175 to the pipe 79 and it connects the cylinder 148 and the pipe 175 to the pipe 157 through a differential resistance valve 176 having a high resistance, for instance 1100#, and the pipe 157 connects the port 156 in the valve 38 to the pipe 172 and it has connected therein at a point intermediate its connection to the resistance valve 176 and its junction with the pipe 172 a resistance valve 177 having a high resistance, for instance 1000#.

It is to be understood that the resistance of the several resistance valves employed in the hydraulic circuit may be varied to meet the requirements of any particular machine and that it is only necessary that certain of the high pressure resistance valves have a higher resistance than others and that certain of the low pressure resistance valves have a lower resistance than others.

The differential resistance valve 176 has a small valve area which is subjected at all times to the pressure in the pipe 157 and a much larger valve area which is subjected to the pressure in the pipe 157 after the valve is open. The difference between these two areas is preferably such that, when once opened, the valve will remain open until the difference between the pressure at its inlet and the pressure at its outlet falls to a predetermined minimum, for instance 200#. The valve 176 has not been illustrated nor described in detail as a differential resistance valve having the characteristics set forth above is fully disclosed in the application of Ernst Wiedmann, Serial Number 462,787, filed June 21, 1930.

The clamping motor 24 has its pull-back cylinder 27 connected at its head end to the drain pipe 130 and at its gland end to one end of a pipe 178 which has a check valve 179 and a resistance valve 180 connected in parallel therein and its other end connected to the pipe 129 at a point intermediate the resistance valve 174 and the cylinder 166. The valve 180 has a low resistance, for instance 25#.

The pipe 136 connects the gland end of the carriage motor 17 to the valve 20 and has a check valve 181 and a resistance valve 182 connected in parallel therein, and the pipe 117 connects the latch cylinder 113 to the pipe 136 at a point intermediate the resistance valve 182 and the valve 20. The resistance valve 182 has a sufficiently high resistance, for instance 200#, to assure a uniform movement of the carriage 3 when it is being advanced.

The pipe 152 has a check valve 183 and a resistance valve 184 connected in parallel therein and it connects the cylinder 146 to a pipe 185 which has one of its ends connected to the front end of a cylinder 186 and its other end connected to a port 187 in a hydraulically operated valve 188. The resistance valve 184 has a resistance intermediate the resistances of the high pressure resistance valves and the low pressure resistance valves, for instance 400#.

The cylinder 186 has a piston 189 arranged therein and provided upon its front end with a small stem 190 for operating the switch 16 and upon its rear end with a larger stem 191 which extends through the rear end of the cylinder 186 and is encircled between its head 192 and the end of the cylinder by a helical compression spring 193 for holding the piston 189 in its inoperative position.

The rear end of the cylinder 186 is connected to the pipe 139 by a pipe 194 through which liquid is supplied to the cylinder 186 for advancing the piston 189 to operate the switch 16.

The valve 188 has a plunger 195 arranged therein for controlling communication between the port 187 and a pipe 196 which is connected to the pipe 194 through a differential resistance valve 197 having a free return check valve 198 forming a part thereof. The valve 197 is similar to the differential resistance valve disclosed in the application of Ernst Wiedmann, Serial Number 462,787 referred to above.

The valve 197 has the characteristic of requiring a high pressure, for instance 900#. to open it and of then remaining open until the difference between the pressures at its inlet and its outlet falls to a predetermined minimum, for instance 200#.

The plunger 195 is urged to the position shown in Fig. 2 by a helical compression spring 199 to close communication between the pipe 196 and the port 187 and to maintain communication between the port 187 and a port 200 which is open at all times to the drain pipe 130, the spring end of the valve 188 being also open at all times to the drain pipe 130.

Assuming that the pumps 21 and 47 are running and that the machine has been brought to rest after completing a cycle of operation, the gear pump 47 is keeping the return pipe 52 and the head end of the pump stroke control cylinder 61 flooded with liquid at a pressure equal to the resistance of the relief valve 56, designated herein as 40#, the pressure in the cylinder 61 is holding the pump 21 at zero stroke, and the gland end of the cylinder 61 is open to the drain pipe 75 through the pipe 71 and the valve 69.

The gear pump 47 is also keeping the pipes 50 and 73 and the right hand ends of the cylinders 78 and 146 flooded with liquid to hold the pistons 77 and 145 retracted, and the output of the pump 47 in excess of the volume required to compensate for leakage is exhausted through the resistance valve 54 and the relief valve 56. The gear pump pressure, therefore, is equal to the resultant of the resistances of the valves 54 and 56, or 240# according to the resistances previously designated herein.

The rear end of the switch actuating cylinder 186 is open to the return pipe 52 through the pipes 194 and 139 and the valve 20, but the pressure therein is not sufficient to overcome the resistance of the spring 193 and the switch 16 remains open.

The left end of the latch cylinder 113 is open to the high pressure supply pipe 51 through the pipes 117 and 136 and the valve 20, and the liquid therein holds the piston 112 retracted against the action of the spring 116.

To start the machine, the operator pushes the piston 141 of the clamp control valve 38 inwardly to the limit of its movement, to open communication between the ports 155, 156 and 158 as shown in Fig. 5, and swings the hand lever 64 against the valve plunger 68 to move it inwardly and open the port 70 to the port 72.

Liquid from the gear pump 47 may now flow through the pipes 50 and 73, the valve 69 and the pipe 71 to the gland end of the cylinder 61 and force the piston 60 to the left, thereby putting the pump 21 on full stroke and expelling liquid from the head end of the cylinder 61 into the return pipe 52.

Liquid from the pump 21 now flows through the pipe 51, the valve 38 and the pipes 159 and 160 to the rear end of the clamping cylinders 26 and moves the pistons 28 forwardly, and the liquid in the front ends of the cylinders 26 is expelled through the pipe 170, the bypass valve 39, and the pipe 168 to the pipe 160 where it is added to the output of the pump 21. Therefore, the pump 21 need supply only a volume of liquid equal to the difference between the displacement of the piston rods 29 and the pull-back rods 31, and the clamp jaws 5 and 8 are advanced at high speed to engage the tubes 6 and 9 respectively.

After the jaws 5 and 8 engage the tubes 6 and 9, pressure rises in the valve 38 and the pipe 157, then liquid breaks through the high pressure resistance valve 177 and forces the plunger 161 of the bypass valve 39 to the right to close communication between the ports 167 and 169 and to open the forward ends of the cylinders 26 to the drain pipe 130 through the pipe 170 and the valve 39, and the liquid in the cylinder 166 is discharged into the return pipe 52 through the pipes 129 and 154 and the valve 38.

The pistons 28 are then advanced at a slower rate by the high pressure liquid delivered to the pipe 160 acting upon their full areas, thereby increasing the pressure exerted by the jaws 5 and 8 upon the tubes 6 and 9 and compressing the springs 35 to store energy in the accumulators 32.

Immediately after the valve plunger 161 is shifted and the forward ends of the cylinders 26 are opened to the drain pipe 130, the hydraulic pressure drops due to the increase in piston area upon which the liquid acts, which enables the piston force to begin to compress the springs 35 from their initial positions without requiring the maximum liquid pressure.

Thereafter, the hydraulic pressure rises as the springs 35 are compressed until it overcomes the resistance of the valve 176 and opens it and then liquid flows into the head end of the cylinder 148 and forces the piston 147 to the right, thereby moving the piston 145 and the plunger 141 to the position shown in Fig. 6 to close the port 158 and trap the liquid in the rear ends of the clamping motor cylinders 26.

With the liquid trapped in the rear ends of the cylinders 26, the springs 35 compensate for any leakage which may occur and maintain the clamping forces exerted by the jaws 5 and 8 substantially constant.

As the pistons 147 and 145 and the plunger 141 move toward the right, liquid is expelled from the cylinder 148 into the drain pipe 130, liquid is expelled from the cylinder 146 into the low pressure supply pipe 50, and liquid is bypassed from one end of the valve chamber 142 to the other end thereof through the return pipe 52.

When the piston 147 stalls at the limit of its movement, pressure rises in the pipes 151, 175 and 79 and in the head end of the cylinder 78 and forces the piston 77 and the valve plunger 68 to the right to open the gland end of the cylinder 61 to the drain pipe 75 and thereby enable the pressure in the head end of the cylinder 61 to move the abutment 59 against the cam 63 and put the pump 21 on short stroke.

As the resistance valve 55 allows the pump 21 to develop pressures up to 1200#, and as only 200# more pressure is required in the pipe 157 than in the pipe 151 to hold the differential resistance valve 176 open after it has been opened by a high pressure, the liquid in the head end of the cylinder 78 may have a pressure as high as 1000# and thus be capable of exerting a greater force upon the piston 77 than the operator can resist. Consequently, the valve plunger 68 is positively operated to open the gland end of the cylinder 78 to the drain pipe 75 and thereby enable the low pressure liquid in the head end of the cylinder 61 to put the pump on short stroke, and then the pump 21 exhausts through the relief valve 55 until the operator reduces the stroke to zero.

The machine is now ready to start the welding operation and the operator moves the lever 64 sufficiently to put the pump 21 on short stroke and pushes the plunger 123 of the carriage control valve 20 inwardly to the limit of its movement to open the pipes 139 and 194 to the supply pipe 51 and the pipes 136 and 117 to the return pipe 52, thereby allowing the high pressure resistance valves to close and the spring 116 to advance the stem 115 of the latch 111 into the path of the catch 110 on the rack 80.

As the port 153 in the valve 38 is open at this time to the return pipe 52, liquid is expelled from the pressure chamber 128 through the pipe 129, the check valve 173, the pipe 154 and the valve 38 to the return pipe 52.

Liquid now flows through the pipe 51, the valve 20 and the pipe 139 to the head end of the carriage motor 17 to advance its piston 19 and the carriage 3, and the liquid in the gland end of the motor 17 is exhausted through the pipe 136, the resistance valve 182 and the control valve 20 to the return pipe 52.

The pressure in the head end of the motor 17 and in the pipe 139 is in excess of that required to overcome the resistance of the valve 182 and this pressure is sufficient to advance the piston 189 against the resistance of the spring 193, thereby closing the switch 16 and connecting the clamp jaws 4 and 7 in circuit. The liquid in the front end of the cylinder 186 is exhausted through the pipe 185 and the valve 188 to the drain pipe 130.

If the welding operations is to be controlled automatically, the operator retains control of the lever 64 until the cam 88 has advanced a sufficient distance to hold the pump 21 on short stroke and then he relinquishes control.

When the tubes 6 and 9 make contact with each other, electric current flows therethrough and flashes or burns off irregularities upon the ends of the tubes and then heats the ends of the tubes to a welding temperature.

The carriage 3 advances at a predetermined rate or rates for a predetermined period of time during the flashing and the heating processes according to the contour and the length of the cam face 106, and then the cam face 108 engages the roller 85 and moves the rack 80 sufficiently to cause the lever 64 to operate the valve 69 and put the pump 21 on full stroke, as previously described, and the stem 115 engages the catch 110 and holds the pump 21 on full stroke.

The carriage 3 then advances at high speed and forces the incandescent ends of the tubes together until it stalls against the stops 43, or until the highly heated metal has been squeezed out into a so-called "flash", leaving the tubes abutting each other in the zone of cooler metal which has sufficient compressed strength to stall the carriage.

If the operator wishes to assume control of the machine for any reason, he simply operates the lever 64 to change the stroke of the pump 21, as the spring 82 allows him to move the rack 80 to decrease the stroke of the pump without affecting the position of the roller 85. If the catch 110 is engaged with the stem 115, he disengages it by means of the latch handle 120 and he may even reverse the carriage 3 by operating the carriage control valve 20.

When the carriage 3 stalls against the stop 43, the pressure rises in the pipes 139 and 194 and liquid breaks through the differential resistance valve 197, forces the plunger 195 of the valve 188 to the right against the action of the spring 199 and then flows through the pipe 185 to the front end of the cylinder 186.

The piston 189 has a greater effective area upon its front end than upon its rear end, due to the difference between the diameters of the stems 190 and 191, and the pressure of the liquid in the front end of the cylinder 186 will rise until the force exerted by it is sufficient to retract the piston 189 and allow the switch 16 to open, thereby removing the tubes 6 and 9 from circuit.

Thereafter, the pressure continues to rise in the pipes 185 and 152 until it overcomes the resistance of the valve 184 and then liquid enters the left end of the cylinder 146 and acts upon the end of the stem 150 to retract the piston 147 and acts upon the piston 145 to move it to the right and force the plunger 141 to its initial position, the liquid in the gland end of the cylinder 146 being expelled into the pipe 50 and the liquid in the head end of the cylinder 148 being expelled through the pipes 151, 175 and 79 and the valve 20 to the drain pipe 130.

The pipe 154 is now open to the high pressure supply pipe 51 and liquid may flow through the pipe 129 to the cylinder 166 on the bypass valve 39 and force the plunger 161 of the valve 39 to the left, the liquid in the cylinder 165 being exhausted through the pipe 172, check valve 171, pipes 160 and 159 and the valve 38 to the return pipe 52.

The liquid then breaks through the low pressure resistance valve 180 and flows through the pipe 178 into the cylinders 27 and retracts the clamp jaws 5 and 8 at high speed, and the liquid in the rear ends of the cylinders 27 exhausts into the drain pipe 130. The liquid in the rear ends of the cylinders 26 is exhausted into the pipe 160 and a part of it is bypassed through the pipe 168, the valve 39 and the pipe 170 to the front ends of the cylinders 26 and the liquid in excess of the volume required to flood the front parts of the cylinders 26 is exhausted through the pipe 159 and the valve 38 to the return pipe 52.

When the pull-back pistons 30 stall at the end of their retraction stroke, the pressure rises in the pipes 154 and 129 and then liquid breaks through the resistance valve 174, enters the chamber 128 and forces the plunger 123 of the valve 20 and the compensating plunger 131 to the positions shown in Fig. 2.

The pipes 139 and 194 are now open to the return pipe 52 through the valve 20, and the spring 199 in the valve 188 forces the plunger 195 to its neutral position, thereby opening the pipe 152 and the front end of the switch motor 186 to the drain pipe 130 and allowing the gear pump pressure in the cylinder 146 to return the piston 145 to its initial position.

Liquid from the pump 21 now flows through the pipe 51, the valve 20, the pipe 136, the check valve 181 and enters the gland end of the motor 17 and retracts the piston 19 and the carriage 3, and liquid is exhausted from the head end of the motor 17 through the pipe 139 and the valve 20 into the return pipe 52. As the pump 21 is on full stroke, the carriage is retracted at high speed.

When the carriage stalls against the stops 44, the pressure rises in the pipes 136 and 117 and liquid breaks through the resistance valve 118 and forces the piston 112 rearwardly against the action of the spring 116 to disengage the stem 115 from the catch 110. The spring 87 then retracts the rack 80 which rotates the cam 63 to its zero position, the spring 74 forces the plunger 68 of the stroke control valve 69 to its neutral position, and liquid is delivered by the gear pump 47 to the cylinder 61 to advance the piston 60 and put the pump 21 on zero stroke.

The machine is then ready to start a second cycle of operation.

If the machine is to be controlled manually throughout the several phases of its operation, the joint 104 in the rod 103 is opened to disconnect the pump control mechanism from the carriage 3, the latch 111 is rendered inoperative by latching the handle 120 behind the pin 121, and the operator manipulates the lever 64 to control the machine.

The invention herein set forth is susceptible of various modifications and adaptations without departing from the scope thereof as hereafter claimed.

The invention is hereby claimed as follows:

1. In a machine having a hydraulic motor and a pump connected in a hydraulic circuit, the combination of means for directing pressure liquid from said pump to said motor to operate the same and to create a hydraulic pressure therein and for then discontinuing the delivery of liquid to said motor and trapping the pressure liquid in said motor, means for diverting the output of said pump to other uses, and means for maintaining the hydraulic pressure in said motor substantially constant after the delivery of liquid to said motor has been discontinued.

2. In a machine having a hydraulic motor and a pump connected in a hydraulic circuit, the combination of means for directing pressure liquid from said pump to said motor to operate the same and to create a hydraulic pressure therein and for then discontinuing the delivery of liquid to said motor and trapping the pressure liquid in said motor, means for diverting the output of said pump to other uses, and an energy accumulator connected to said motor for maintaining the hydraulic pressure therein substantially constant after the delivery of liquid to said motor has been discontinued.

3. In a machine having a reciprocating hydraulic motor and a pump connected in a hydraulic circuit, the combination of means for directing pressure liquid from said pump to said motor to operate the same and to create a hydraulic pressure therein and cause said motor to exert a force upon an object and for then discontinuing the delivery of liquid to said motor and trapping the pressure liquid in said motor, means for diverting the output of said pump to other uses, and an energy accumulator arranged between said motor and said object for maintaining said force substantially constant after the delivery of liquid to said motor has been discontinued.

4. In a machine having a reciprocating hydraulic motor and a pump connected in a hydraulic circuit, the combination of means for directing pressure liquid from said pump to said motor to operate the same and to create a hydraulic pressure therein and cause said motor to exert a force upon an object and for then discontinuing the delivery of liquid to said motor and trapping the pressure liquid in said motor, means for diverting the output of said pump to other uses, and a caged spring arranged between said motor and said object for maintaining said force substantially constant after the delivery of liquid to said motor has been discontinued.

5. In a machine having a reciprocating hydraulic motor and a pump connected in a hydraulic circuit, the combination of means for directing pressure liquid from said pump to said motor to operate the same and to create a hydraulic pressure therein and cause said motor to exert a force upon an object and for then discontinuing the delivery of liquid to said motor and trapping the pressure liquid in said motor, means for diverting the output of said pump to other uses, and a nest of caged springs arranged between said motor and said object for maintaining said force substantially constant after the delivery of liquid to said motor has been discontinued.

6. In a machine having a clamp and carriage, the combination of a hydraulic motor for operating said clamp, a hydraulic motor for operating said carriage, a pump for operating both of said motors, means for directing liquid from said pump to said clamp motor to cause the same to close said clamp and create a holding force between the jaws thereof and then trap the liquid in said motor, means for then directing liquid from said pump to said carriage motor to operate the same, and means for maintaining said holding force substantially constant during the operation of said carriage motor.

7. In a machine having a clamp and a carriage, the combination of a hydraulic motor for operating said clamp, a hydraulic motor for operating said carriage, a pump for operating both of said motors, means for directing liquid from said pump to said clamp motor to cause the same to close said clamp and create a holding force between the jaws thereof and then trap the liquid in said motor, means for then directing liquid from said pump to said carriage motor to operate the same, and an energy accumulator for maintaining said holding force substantially constant during the operation of said carriage motor.

8. In a machine having a clamp and a carriage, the combination of a hydraulic motor for operating said clamp, a hydraulic motor for operating said carriage, a pump for operating both of said motors, means for directing liquid from said pump to said clamp motor to cause the same to close said clamp and create a holding force between the jaws thereof and then trap the liquid in said motor, means for then directing liquid from said pump to said carriage motor to operate the same, and means arranged between said clamp and its motor for maintaining said holding force substantially constant during the operation of said carriage motor.

9. In a machine having a clamp and a carriage, the combination of a hydraulic motor for operating said clamp, a hydraulic motor for operating said carriage, a pump for operating both of said motors, means for directing liquid from said pump to said clamp motor to cause the same to close said clamp and create a holding force between the jaws thereof and then trap the liquid in said motor, means for then directing liquid from said pump to said carriage motor to operate the same, and a caged spring arranged between said clamp and its motor for maintaining said holding force substantially constant during the operation of said carriage motor.

10. In a machine having a clamp and a carriage, the combination of a hydraulic motor for operating said clamp, a hydraulic motor for operating said carriage, a single source for supplying liquid to both of said motors to operate the same, means including a valve for directing liquid from said source to both ends of said clamp motor to operate said clamp at high speed, means for then directing said liquid to the pressure end only of said clamp motor to create a holding pressure therein, means for then operating said valve to trap said liquid in the pressure end of said motor, means for then directing liquid from said source to said carriage motor to operate the same, and means for maintaining said holding pressure substantially constant during the operation of said carriage motor.

11. In a machine having a clamp and a carriage, the combination of a hydraulic motor for operating said clamp, a hydraulic motor for operating said carriage, a pump for operating both of said motors, means including a valve for directing liquid from said pump to both ends of said clamp motor to operate said clamp at high speed, means for then directing said liquid to the pressure end only of said clamp motor to create a holding pressure therein, means for then operating said valve to trap said liquid in the pressure end of said motor, means for then directing liquid from said pump to said carriage motor to operate the same, and a caged spring arranged between said clamp and its motor for maintaining said holding pressure substantially constant during the operation of said carriage motor.

12. A welding machine, comprising a frame, a carriage arranged upon said frame to slide thereon, a hydraulic clamp motor carried by said frame in a stationary position, a hydraulic clamp motor connected in parallel with said stationary clamp motor and secured to said carriage to move therewith, a stationary clamp having one of its jaws fixed to said frame and its other jaw movable toward and from its fixed jaw by said stationary clamp motor, a movable clamp having one of its jaws fixed to said carriage and its other jaw movable toward and from its fixed jaw by said movable clamp motor, a hydraulic motor for operating said carriage, a pump connected to all of said motors for supplying liquid thereto to operate the same, means for directing pressure liquid from said pump to said clamp motors to operate the same and cause said clamps to exert a gripping force between the jaws thereof and for blocking the connection between said pump and said clamp motors to discontinue further delivery of liquid to said clamp motors and to trap the pressure liquid therein, means for then directing liquid from said pump to said carriage motor to operate the same, and an energy accumulator arranged between each clamp motor and the clamp jaw operated thereby for maintaining said gripping force substantially constant after the delivery of liquid to said clamp motors has been discontinued.

13. A welding machine, comprising a frame, a carriage arranged upon said frame to slide thereon, a hydraulic clamp motor carried by said frame in a stationary position, a hydraulic clamp motor connected in parallel with said stationary clamp motor and secured to said carriage to move therewith, a stationary clamp having one of its jaws fixed to said frame and its other jaw movable toward and from its fixed jaw by said stationary clamp motor, a movable clamp having one of its jaws fixed to said carriage and its other jaw movable toward and from its fixed jaw by said movable clamp motor, a hydraulic motor for operating said carriage, a source of pressure liquid connected to all of said motors for supplying liquid thereto to operate the same, means for directing pressure liquid from said source to said clamp motors to operate the same and cause said clamps to exert a gripping force between the jaws thereof and for blocking the connection between said source and said clamp motors to discontinue further delivery of liquid to said clamp motors and to trap the pressure liquid therein, means for then directing liquid from said source to said carriage motor to operate the same, and a caged spring arranged between each clamp motor and the clamp jaw operated thereby for maintaining said gripping force substantially constant after the delivery of liquid to said clamp motors has been discontinued.

14. In a machine having a hydraulic motor and a variable displacement pump for supplying liquid to said motor, means for controlling the volumetric delivery of said pump comprising means for controlling the stroke of said pump through a low range to operate said motor at closely graduated slow speeds, and hydraulic means for controlling the stroke of said pump above said low range to operate said motor at high speeds.

15. In a machine having a hydraulic motor and a variable displacement pump for supplying liquid to said motor, means for controlling the volumetric delivery of said pump comprising manual means for controlling the stroke of said pump through a low range, hydraulic means for controlling the stroke of said pump above said low range, and valve means operable by said manual means for controlling said hydraulic means.

16. In a machine having a hydraulic motor and a variable displacement pump for supplying liquid to said motor, means for controlling the volumetric delivery of said pump comprising manual means for controlling the stroke of said pump through a low range, hydraulic means for controlling the stroke of said pump above said low range, valve means for controlling said hydraulic means and operable by said manual means to cause said hydraulic means to increase the stroke of said pump beyond said low range, and automatic means for operating said valve means against the resistance of said manual means to enable said hydraulic means to decrease the stroke of said pump.

17. In a machine having a hydraulic motor and a variable displacement pump for supplying liquid to said motor, means for controlling the volumetric delivery of said pump comprising a cylinder, a piston arranged in said cylinder and having its rod connected to said pump for controlling the stroke thereof, manual means for operating said rod to control the stroke of said pump through a low range, means for delivering liquid to said cylinder, valve means for controlling the delivery of liquid to said cylinder and operable by said manual means to cause said piston to increase the stroke of said pump beyond the control of said manual means, and means responsive to the pressure created by said pump for operating said valve means to cause said piston to return the control of said pump to said manual means.

18. A welding machine, comprising a frame, a carriage arranged upon said frame, a stationary clamp carried by said frame, a movable clamp carried by said carriage, a hydraulic motor carried by said frame for operating said stationary clamp, a reciprocating hydraulic motor carried by said carriage and connected in parallel with the other clamp motor for operating said movable clamp, a reciprocating hydraulic motor for operating said carriage, a variable delivery pump connected in circuit with all of said motors for supplying liquid thereto, a clamp control valve for delivering liquid from said pump to said clamp motors for operating the same, a bypass valve for bypassing liquid from the exhaust ends of said clamp motors to the pressure ends thereof and automatically operable to discontinue bypassing said liquid after the force exerted by said motors reaches a predetermined maximum, means for automatically operating said clamp control valve to trap the liquid in the pressure ends of said clamp motors after the pressure therein reaches a predetermined maximum, means for maintaining the pressure in said clamp motors substantially constant after the liquid has been trapped therein, a carriage control valve for directing liquid from said pump to said carriage motor to operate the same, means for controlling the delivery of said pump to thereby advance said carriage at varying speeds and to retract it at high speed, means for reversing said valve to retract said carriage, and means for operating said clamp control valve to open said clamps after said carriage has been retracted.

19. A welding machine, comprising a frame, a carriage arranged upon said frame, a stationary clamp carried by said frame, a movable clamp carried by said carriage, a hydraulic motor carried by said frame for operating said stationary clamp, a reciprocating hydraulic motor carried by said carriage and connected in parallel with the other clamp motor for operating said movable clamp, a reciprocating hydraulic motor for operating said carriage, a variable delivery pump connected in circuit with all of said motors for supplying liquid thereto, a clamp control valve for delivering liquid from said pump to said clamp motors for operating the same, a bypass valve for bypassing liquid from the exhaust ends of said clamp motors to the pressure ends thereof and automatically operable to discontinue bypassing said liquid after the force exerted by said motors reaches a predetermined maximum, means for automatically operating said clamp control valve to trap the liquid in the pressure ends of said clamp motors after the pressure therein reaches a predetermined maximum, means for maintaining the pressure in said clamp motors substantially constant after the liquid has been trapped therein, a carriage control valve for directing liquid from said pump to said carriage motor to operate the same, means for controlling the delivery of said pump to thereby advance said carriage at varying speeds and to retract it at high speed, pressure responsive means for reversing said valve to retract said carriage, and pressure responsive means for operating said clamp control valve to open said clamps after said carriage has been retracted.

20. A welding machine, comprising a frame, a carriage arranged upon said frame, a stationary clamp carried by said frame, a movable clamp carried by said carriage, a hydraulic motor carried by said frame for operating said stationary clamp, a reciprocating hydraulic motor carried by said carriage and connected in parallel with the other clamp motor for operating said movable clamp, a reciprocating hydraulic motor for operating said carriage, a variable delivery pump connected in circuit with all of said motors for supplying liquid thereto, a clamp control valve for delivering liquid from said pump to said clamp motors for operating the same, a bypass valve for bypassing liquid from the exhaust ends of said clamp motors to the pressure ends thereof and automatically operable to discontinue bypassing said liquid after the force exerted by said motors reaches a predetermined maximum, means for automatically operating said clamp control valve to trap the liquid in the pressure ends of said clamp motors after the pressure therein reaches a predetermined maximum, means for maintaining the pressure in said clamp motors substantially constant after the liquid has been trapped therein, a carriage control valve for directing liquid from said pump to said carriage motor to operate the same, means responsive to the movement of said carriage for controlling the delivery of said pump to thereby advance said carriage at varying speeds and to retract it at high speed, pressure responsive means for reversing said valve to retract said carriage, and pressure responsive means for operating said clamp control valve to open said clamps after said carriage has been retracted.

21. In a machine having a movable part, a hydraulic motor for moving said part and a variable displacement pump for delivering liquid to said motor to operate the same, the combination of means for controlling the stroke of said pump through a low range to operate said motor at closely graduated slow speeds, means for operating the aforesaid means in response to the movement of said movable part, and hydraulic means for controlling the stroke of said pump above said low range to operate said motor at high speeds.

22. In a machine having a movable part, a hydraulic motor for moving said part and a variable displacement pump for delivering liquid to said motor to operate the same, the combination of means for controlling the stroke of said pump through a low range to operate said motor at closely graduated slow speeds, means operable either manually or in response to the movement of said movable part for operating the aforesaid means, and hydraulic means for controlling the stroke of said pump above said low range to operate said motor at high speeds.

WALTER FERRIS.
JOHN P. FERRIS.
GLEN MACOMBER.